(12) United States Patent
Bevirt

(10) Patent No.: US 8,087,836 B2
(45) Date of Patent: *Jan. 3, 2012

(54) MINIATURE MOUNTING APPARATUS

(75) Inventor: JoeBen Bevirt, Santa Cruz, CA (US)

(73) Assignee: Joby Photo, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,962

(22) Filed: Dec. 15, 2009

(65) Prior Publication Data

US 2010/0220992 A1 Sep. 2, 2010

Related U.S. Application Data

(60) Provisional application No. 61/201,875, filed on Dec. 15, 2008.

(51) Int. Cl.
*G03B 17/00* (2006.01)
(52) U.S. Cl. ...................................... 396/428
(58) Field of Classification Search .................... 396/428
See application file for complete search history.

(56) References Cited

U.S. PATENT DOCUMENTS

| 2,684,822 | A * | 7/1954 | Odin .......................... 248/179.1 |
| 3,356,325 | A * | 12/1967 | Schnase ...................... 248/187.1 |
| 6,626,210 | B2 * | 9/2003 | Luettgen et al. .............. 138/120 |
| 7,533,906 | B2 * | 5/2009 | Luettgen et al. ............ 285/146.1 |
| 7,798,452 | B1 * | 9/2010 | Wessells et al. ........... 248/163.1 |
| 7,891,615 | B2 * | 2/2011 | Bevirt ......................... 248/181.1 |
| 2006/0086868 | A1 * | 4/2006 | White ......................... 248/163.1 |
| 2007/0212163 | A1 * | 9/2007 | Bevirt ............................. 403/56 |
| 2008/0265111 | A1 * | 10/2008 | Darrow ...................... 248/163.1 |
| 2008/0283697 | A1 * | 11/2008 | Darrow ...................... 248/163.1 |
| 2009/0039213 | A1 * | 2/2009 | Darrow ...................... 248/163.1 |
| 2009/0101772 | A1 * | 4/2009 | Bevirt ........................ 248/180.1 |
| 2010/0259144 | A1 * | 10/2010 | Bevirt et al. .................. 312/237 |

\* cited by examiner

*Primary Examiner* — Rodney Fuller
(74) *Attorney, Agent, or Firm* — Michael A. Guth

(57) ABSTRACT

A miniature tripod assembly adapted to mount to the bottom of a camera, or other device, and to be small enough to fit within the profile of the device. The miniature tripod assembly may use ball and socket joint connectors which, when interconnected, form a flexible assembly. In some embodiments, the ball and socket joint connectors utilize an overmolded strip around the outside of the connector to facilitate in their use for gripping. In some embodiments, device may use flexible and extendable legs.

14 Claims, 12 Drawing Sheets

SECTION A-A

MINIATURE MOUNTING APPARATUS

CROSS-REFERENCE TO RELATED APPLICATIONS

This application claims priority to U.S. Provisional Application No. 61/201,875 to Bevirt, filed Dec. 15, 2008.

BACKGROUND

1. Field of the Invention

The present invention relates to a miniature mounting apparatus for cameras, and more specifically to a mounting apparatus using flexible or gripping legs.

2. Description of Related Art

Typical tripod assemblies consist of three rigid legs which are splayed out to form a support structure for devices such as cameras. The legs are usually rigid and adapted to provide support off of the ground or other flat surface. Some tripods have some adjustment to leg length which may allow for some deviation from flatness in the surface upon which they are mounted. Such tripods also typically are large enough that they are not stored attached to the device, such as a camera, which they are used to support.

Such tripods are limited in the manner in which they support devices such as cameras. What is called for is a mounting apparatus that may function as a tripod and also as a grip mount for the mounting to vertical members. What is also called for is a miniature tripod small enough to be mounted to the camera and to not interfere with normal use of the camera when the tripod is not used.

SUMMARY

The present invention is directed towards a miniature tripod assembly adapted to mount to the bottom of a camera, or other device, and to be small enough to fit within the profile of the device. The miniature tripod assembly may use ball and socket joint connectors which, when interconnected, form a flexible assembly.

In some embodiments, the ball and socket joint connectors utilize an over-molded strip around the outside of the connector to facilitate in their use for gripping. In some embodiments, device may use flexible and extendable legs.

DETAILED DESCRIPTION

Figure 1:
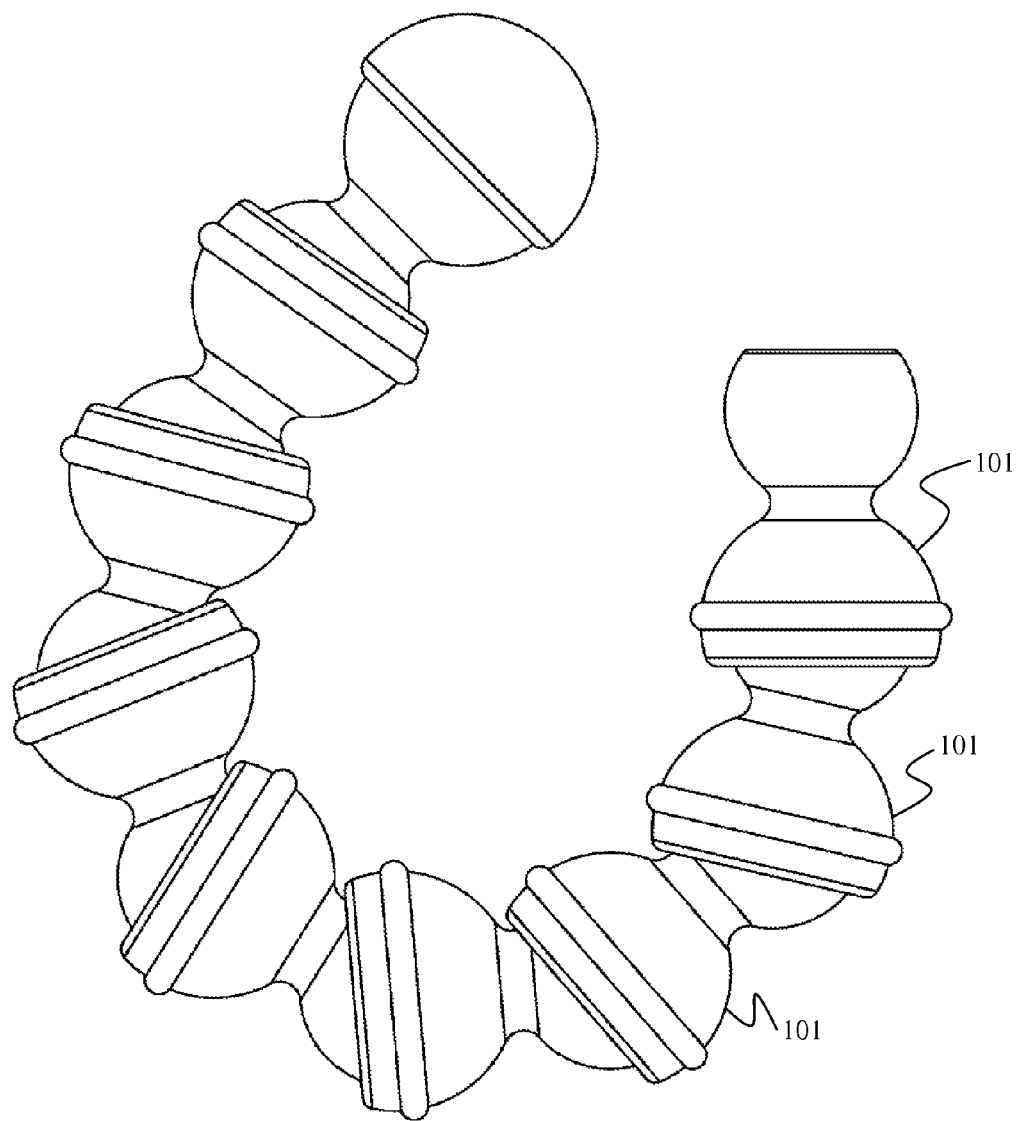
FIG. 1 illustrates a side view of a plurality of connected connectors according to some embodiments of the present invention.
Figure 2:
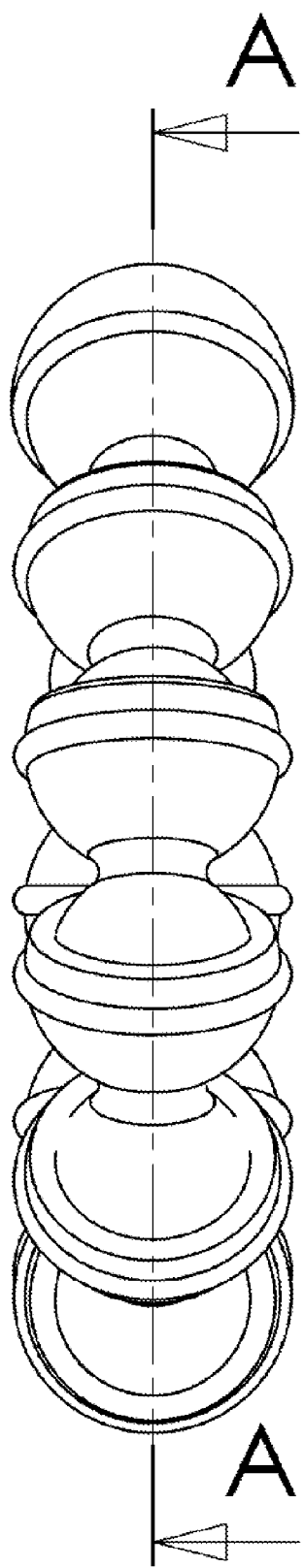
FIG. 2 illustrates an end view of a plurality of connected connectors according to some embodiments of the present invention.
Figure 3:
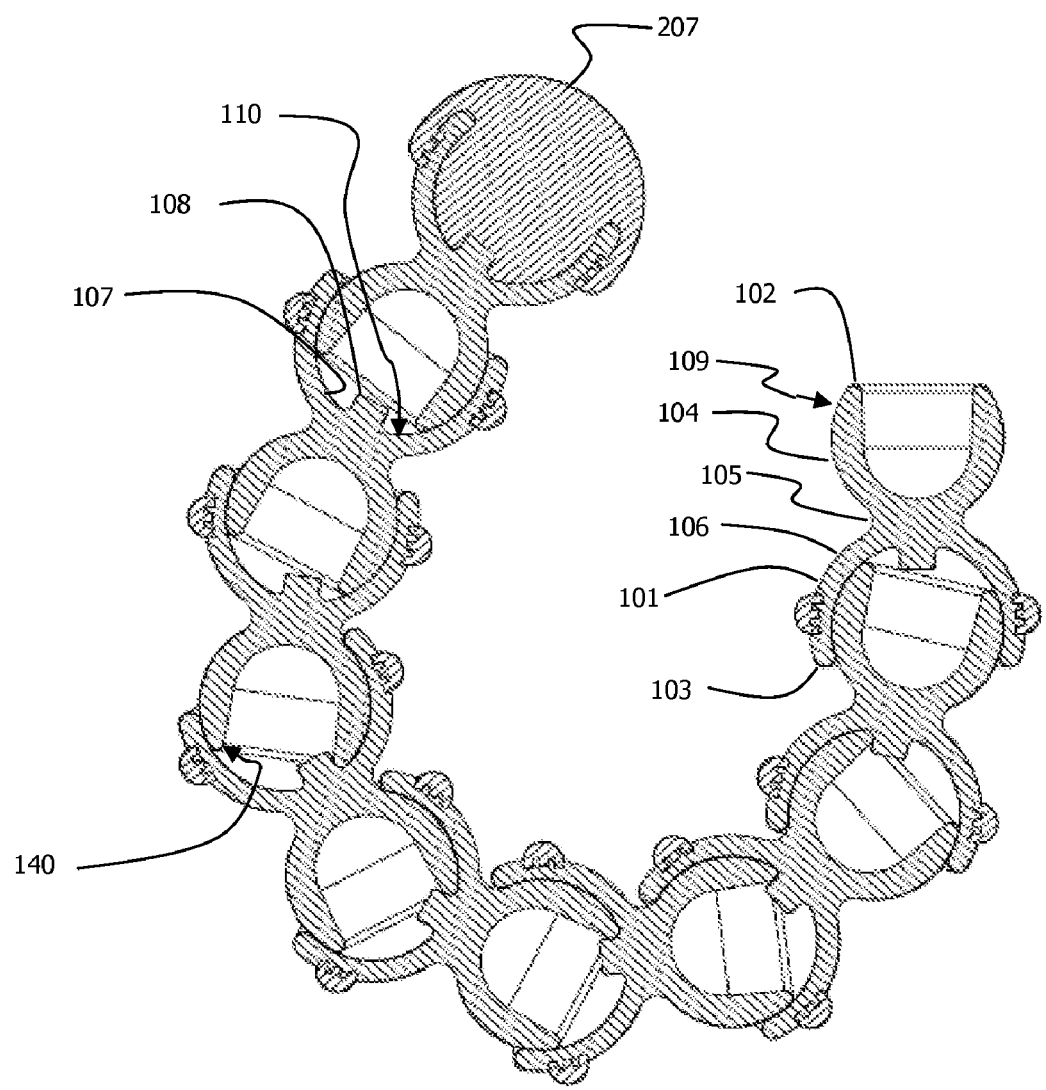
FIG. 3 is a cross-sectional view of a plurality of connected connectors according to some embodiments of the present invention.

FIGS. 1, 2, and 3 illustrate a plurality of ball and socket joint connectors 101 according to some embodiments of the present invention. A connector 101 has a first end portion 102 and a second end portion 103. A socket engaging end surface 104 is present at the first end 102. The first end portion 102 is substantially hollowed out.

The second end portion 103 has a body 106 with an internal socket receiving cavity 107. The inner surface 110 of the an internal socket receiving cavity 107 is adapted to fit over the socket engaging end surface 104 of another connector 101, or of another piece with a similar socket engaging end surface. A neckdown 105 separates the first end portion 102 from the second end portion 103. A stop nub 108 acts as a mechanical stop to prevent over angulation and possible unintentional separation of a ball and socket joint connector pair.

In some embodiments of the present invention, the wall thicknesses of the internal socket receiving cavity or the socket engaging end surface, or both, are constructed so that an interference fit remains after the ball and socket joint connectors are connected. In some embodiments, the interference fit is designed such that the material is stressed to a stress level below that of the plastic limit but above the creep limit. The material may then creep until the interference is at or below the creep limit, typically down to the upper end of the elastic deformation stress range of the material. In such an embodiment using a plurality of connectors connected together to form a longer chain, the stresses will tend to equalize in the different connector pairs. This equalization of stresses will tend to equalize the frictions of the various connector pairs. An equalization of the frictions in the connector pairs in a long chain of connected connectors will tend to allow the chain of connectors to bend in a smooth fashion when the chain is subjected to bending forces. For example, in a 10 unit chain bent to a 45 degree angle, the bending may be well spread among the connector pairs.

Figure 4:
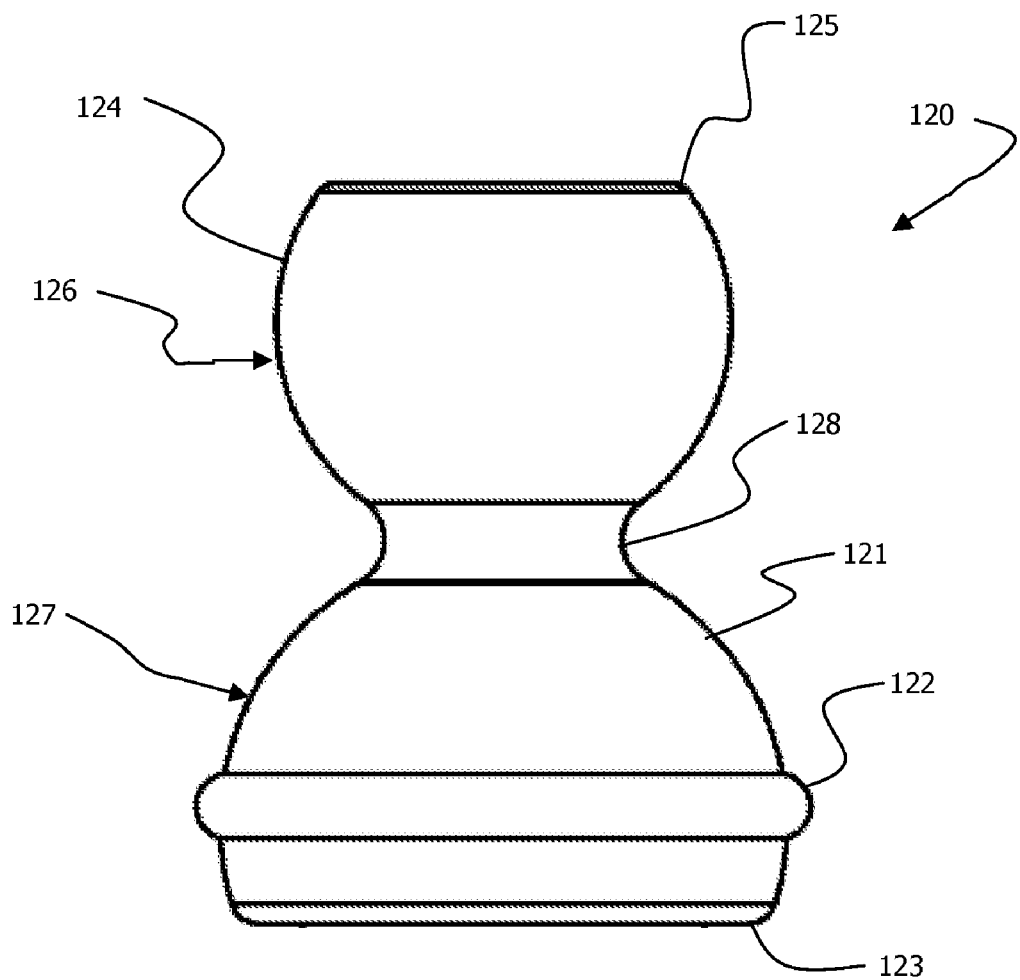
FIG. 4 is illustrates a connector with a gripping portion according to some embodiments of the present invention.
Figure 5:
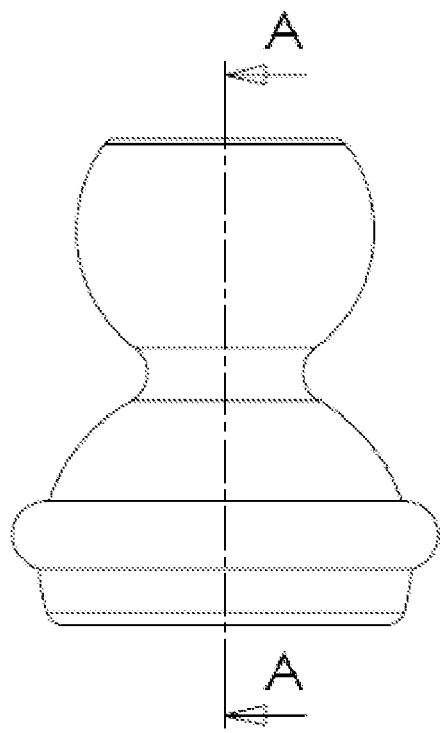
FIG. 5 is a side view of a connector with a gripping portion according to some embodiments of the present invention.
Figure 6:
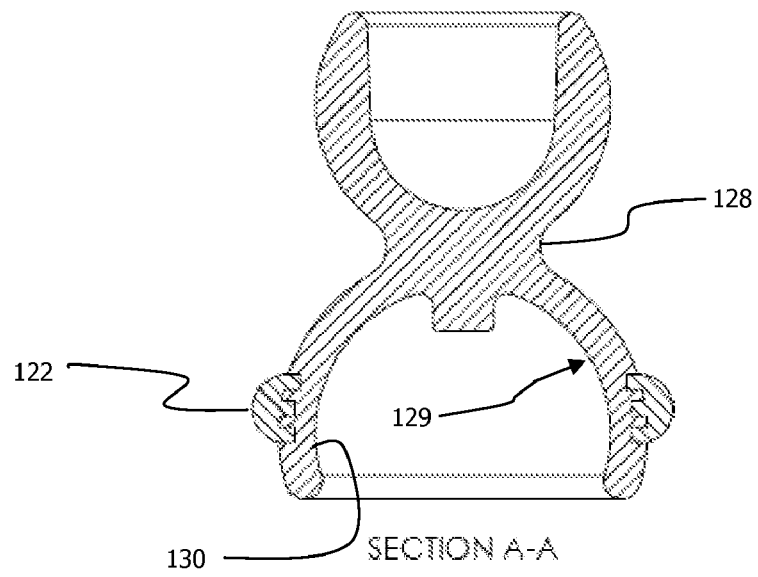
FIG. 6 is a cross-sectional view of a connector with a gripping portion according to some embodiments of the present invention.

In some embodiments, as seen in FIGS. 4, 5, and 6, a connector 120 includes a gripping portion 122. The connector 120 has a first end portion 125 and a second end portion 123. A socket engaging end surface 124 is present at the first end 125. The first end portion 125 is substantially hollowed out.

The second end 123 has a body 121 with an internal socket receiving cavity 130. The inner surface 129 of the an internal socket receiving cavity 130 is adapted to fit over the socket engaging end surface 124 of another connector, or of another piece with a similar socket engaging end surface. A neckdown 128 separates the first end portion 125 from the second end portion 123. A gripping portion 122 allows the connector to grip surfaces more readily. In some embodiments, the gripping portion is co-molded into the connector body. In some embodiments, the gripping portion is a rubberized compound. In some embodiments, the gripping portion is a circumferential ring molded into the outer surface of the connector. The gripping portion may provide a higher friction interface when the connector is set upon or wrapped around an object.

FIG. 3 illustrates a cross-sectional view of a plurality of ball and socket joint connectors. In some embodiments of the present invention, a stop nub 108 resides within the internal socket receiving cavity. The inner rim 140 of the socket engaging end surface 104 is adapted to contact the stop nub 108 as the two connectors reach a certain angle relative to each other. The contact of the stop nub 108 and the inner rim 140 of the socket engaging end surface 104 acts as a mechanical stop with regard to further angulation of the two pieces relative to each other. The mechanical stop function works to prevent over-rotation and possible disconnection of the two connectors.

In some embodiments, the legs are of sufficient flexibility that the may be used to wrap around items such as bars or other objects in order to fasten the tripod apparatus to objects that would not be suitable for mounting of a typical tripod. In conjunction with the gripping portion, this allows the tripod apparatus to be fastened to a variety of objects. For example, when used to position a digital camera, the legs may wrap around a vertical gate rail, allowing the mounting of the camera for a photo taking opportunity not previously available.

In some embodiments, the body of the tripod has an interconnect portion that is adapted to receive a clip. A clip is removably fastened to the interconnect portion. The clip may have a threaded post adapted to fit into a camera or other device in some embodiments.

Figure 7:
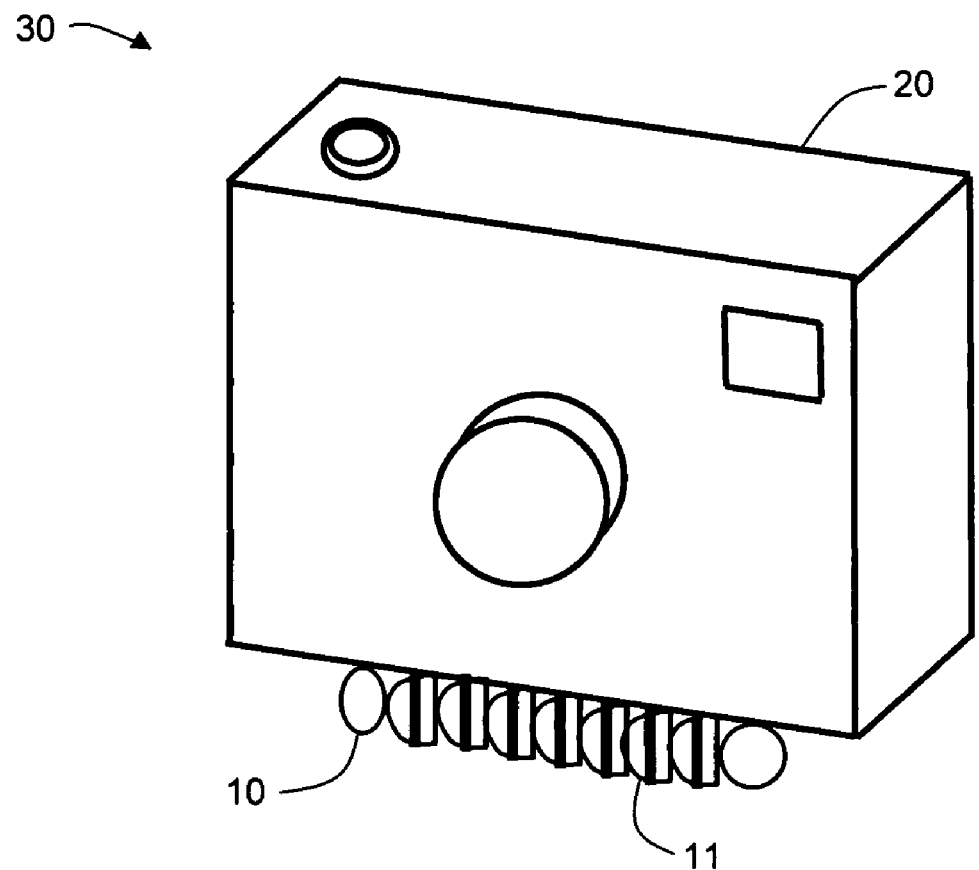
FIG. 7 is an illustration of a camera with a miniature mounting apparatus in a stowed position according to some embodiments of the present invention.

In some embodiments of the present invention, as seen in FIG. 7, a camera and miniature tripod assembly 30 is seen with a camera 20. A miniature tripod assembly 10 is seen with a leg 11 of the tripod. In some embodiments, the miniature tripod assembly is designed such that it does not protrude past the extended profile of the camera to which it is mounted. In some embodiments, the legs of the tripod are flexible. In some embodiments, the flexible legs have a rubbery or otherwise frictional outer surface such that the flexible legs may be wrapped around a feature to attach the tripod as gripping mounting structure for the tripod. In some embodiments, the legs of the tripod may have ball and socket connectors as described above. In some embodiments, the ball and socket connectors may have a gripping portion as described above.

Figure 8:
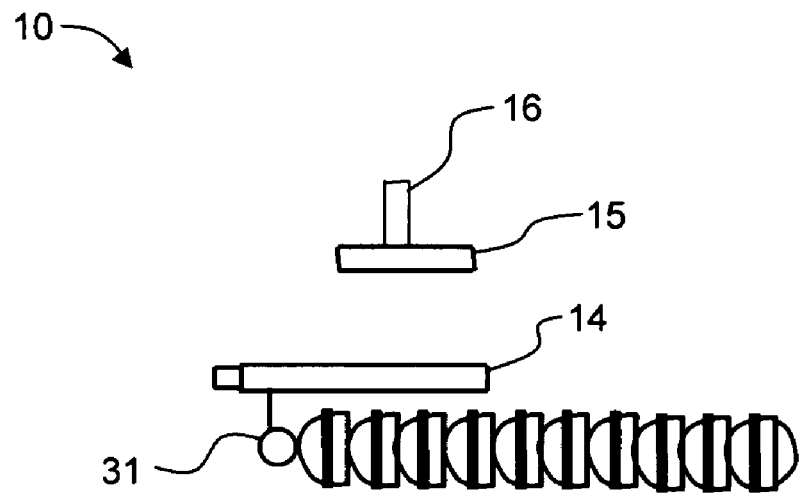
FIG. 8 is an exploded side view of a miniature mounting apparatus according to some embodiments of the present invention.
Figure 9:
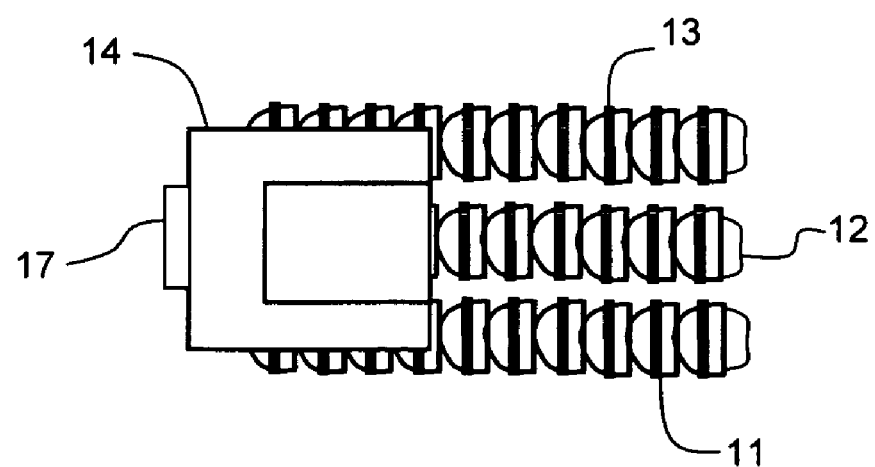
FIG. 9 is a top view of a miniature mounting apparatus according to some embodiments of the present invention.

In some embodiments of the present invention, as seen in FIGS. 8 and 9, a miniature tripod assembly 10 is seen in the stowed position, which is adapted to allow for mounting to the tripod mounting hole of a camera, which is typically on the bottom of the camera. In some embodiments, the miniature tripod assembly 10 has three legs 11, 12, 13 which are adapted to stow flat along the bottom of the camera to which the miniature tripod assembly 10 is mounted.

In some embodiments, the legs 11, 12, 13 are attached to an interconnect 14 by pivots 31 which may allow for the deployment of the upper portion of the legs 11, 12, 13 but may be adapted to have sufficient friction that the upper portion of the legs remains at the set angle of the pivot under the normal loads associated with supporting the camera. In some embodiments, all legs have a pivot or other device such that the legs may be rotated flat along the bottom of the camera in the same direction, greatly minimizing the envelope of the stowed tripod. The interconnect may be adapted to support a removable clip 15 in some embodiments. In some embodiments, the interconnect may be adapted to be directly attached to the camera. The clip 15 may incorporate a threaded stud 16 which is typically the method of attachment up into the bottom of the camera. The clip 15 may clip into a slot 32 in the interconnect, and may lock in place. A release clip 17 may be used to release the clip 15 from the slot 32.

Figure 10:
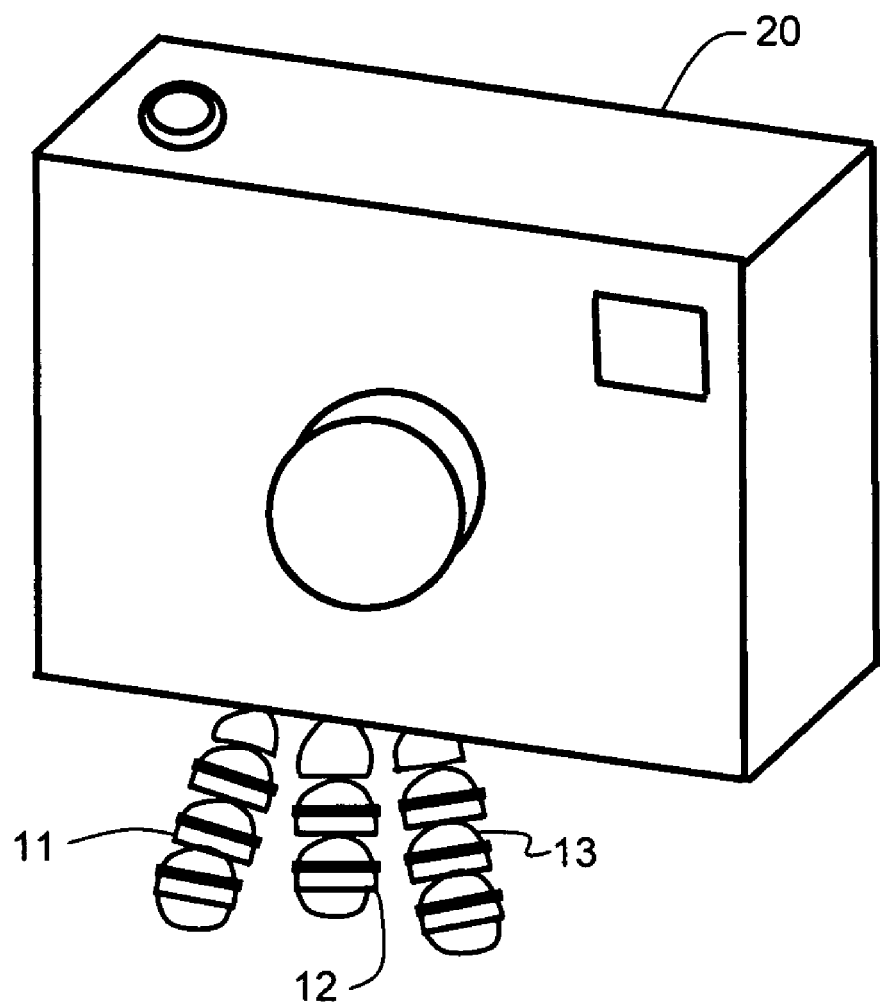
FIG. 10 is an illustration of a camera with a miniature mounting apparatus in a deployed position according to some embodiments of the present invention.

FIG. 10 illustrates a camera and miniature tripod assembly with the tripod legs 11, 12, 13 in the deployed position. The camera 20 may be supported by the legs in this position in the manner of a typical tripod. In some embodiments, the legs may be deployed to slightly different angles to allow for placement on uneven surfaces. In some embodiments, the legs may be flexible, such as with the use of ball and socket features, and may be flexes to accommodate uneven mounting surfaces.

Figure 11:
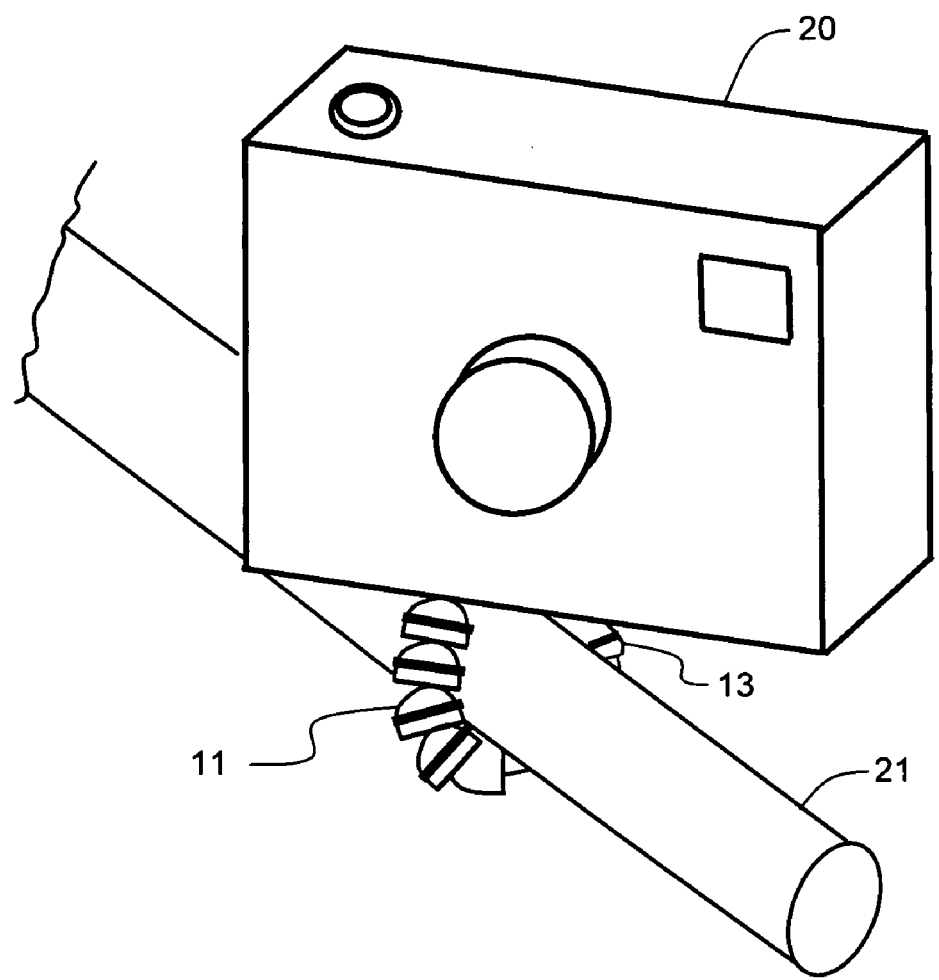
FIG. 11 is an illustration of a camera with a miniature mounting apparatus in a mounted position according to some embodiments of the present invention.

FIG. 11 illustrates a camera and miniature tripod assembly with the legs in a mounted position. As seen, the legs have been wrapped around a pole 21. Thus, the camera 20 is able to mounted to unusual features, such as a gate, or fence, using a tripod that is adapted to fit within the outline of the bottom of the camera. In some embodiments, the legs will be ball and socket features with gripping portions on their exteriors adapted to better grip the item being mounted to. In some embodiments, the legs may be flexible and have an exterior gripping surface adapted to be mounted to irregular features.

Figure 12:
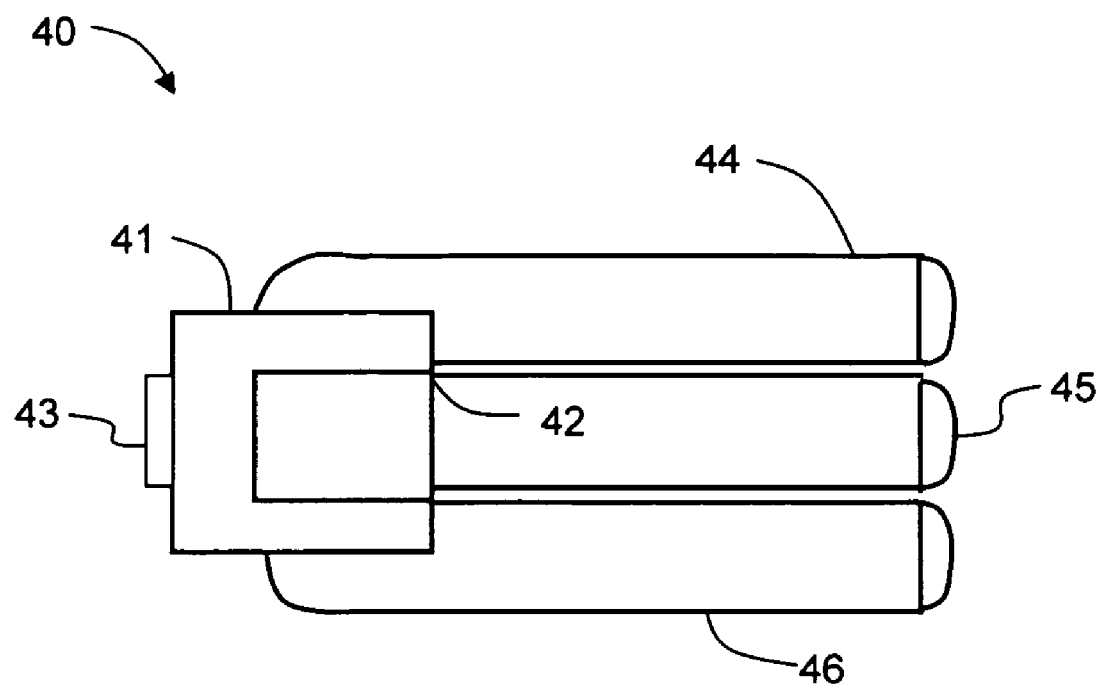
FIG. 12 is a top view of a miniature mounting apparatus according to some embodiments of the present invention.

In some embodiments of the present invention, as seen in FIG. 12, a miniature tripod assembly 40 is seen in the stowed position, which is adapted to allow for mounting to the tripod mounting hole of a camera, which is typically on the bottom of the camera. In some embodiments, the miniature tripod assembly 40 has three legs 44, 45, 46 which are adapted to stow flat along the bottom of the camera to which the miniature tripod assembly 40 is mounted.

In some embodiments, the legs 44, 45, 46 are attached to an interconnect 41 by pivots or other means which may allow for the deployment of the upper portion of the legs 44, 45, 46 but may be adapted to have sufficient friction that the upper portion of the legs remains at the set angle of the pivot under the normal loads associated with supporting the camera. The interconnect may be adapted to support a removable clip in some embodiments. In some embodiments, the interconnect may be adapted to be directly attached to the camera. The clip may incorporate a threaded stud which is typically the method of attachment up into the bottom of the camera. The clip may clip into a slot 42 in the interconnect, and 42.

Figure 13:
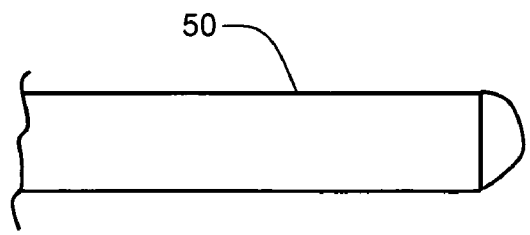
FIG. 13 is a view of a leg of a miniature mounting apparatus according to some embodiments of the present invention.
Figure 14:
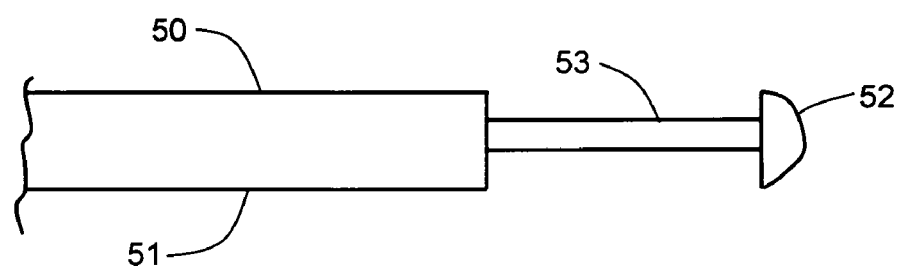
FIG. 14 is a view of a leg of a miniature mounting apparatus according to some embodiments of the present invention.
Figure 15:
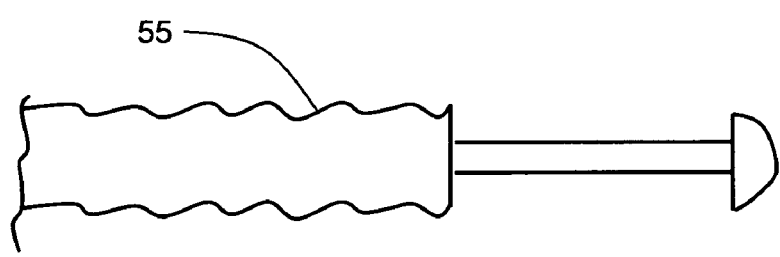
FIG. 15 is a view of a leg of a miniature mounting apparatus according to some embodiments of the present invention.

In some embodiments, as seen in FIGS. 13 and 14, the leg 50 of the miniature tripod assembly may be extendable. The outer portion 51 may have an extension 53 which extends from the outer portion 51. A tip 52 may be found on the end of the extension 53. In some embodiments, the leg 50 may be flexible. In some embodiments, as seen in FIG. 15, the outer portion 55 of the leg may be roughed or of a gripping material to allow for a variety of deployed uses.

Figure 16:
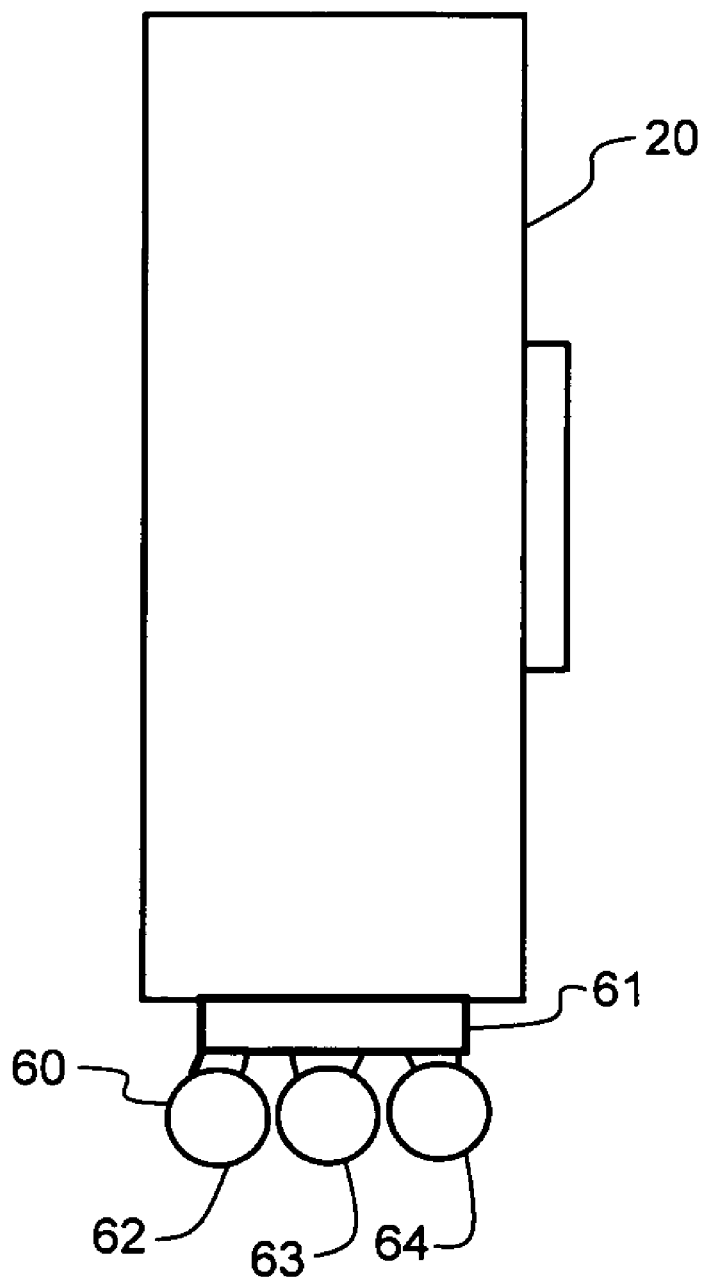
FIG. 16 is a side view of a camera with a miniature mounting apparatus according to some embodiments of the present invention.

FIG. 16 illustrates a camera 20 with a miniature tripod assembly 60 attached to its bottom surface. In some embodiments, the legs 62, 63, 64 are adapted to reside underneath the profile of the exterior of the camera 20 such that the camera may be easily used when the miniature tripod is in the stowed position. This may allow the miniature tripod to be attached to the camera during use, and be available for use as needed, yet not interfere with the use of the camera when a tripod is not desired.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A miniature tripod comprising:
   an interconnect portion;
   a plurality of flexible legs, said flexible legs comprising a first end and a second end, said first end connected to said interconnect portion said plurality of flexible legs connected to said interconnect portion such that said legs are coplanar in a first stowed position; and
   a clip removably attached to said interconnect portion, said clip having a mounting plane adapted to face an item being mounted to,
   wherein said plurality of flexible legs connected to said interconnect portion with a pivotable connection, wherein said pivotable connection can pivot said legs from a first stowed position in a direction parallel to the mounting plane of the clip to one or more deployed positions.

2. The miniature tripod of claim 1 wherein each of said plurality of flexible legs comprises a plurality of connectors, said connectors comprising:
   a connector body, said connector body comprising:
      a first end portion;
      a second end portion; and
      a longitudinal axis extending from said first end portion to said second end portion;
      a socket engaging end surface at said first end portion, said socket engaging end surface being the external surface at said first end portion; and
      an internal receiving cavity at said second end portion.

3. The miniature tripod of claim 2 wherein said connector body further comprises a gripping portion, said gripping portion co-molded to said connector.

4. The miniature tripod of claim 3 wherein said gripping portion comprises a rubberized compound.

5. The miniature tripod of claim 4 wherein said gripping portion comprises a circumferential ring co-molded into the outer surface of said second end portion of said connector body.

6. The miniature tripod of claim 2 wherein said interconnect portion comprises a clip release.

7. The apparatus of claim 2 wherein said plurality of flexible legs consists of three legs.

8. The miniature tripod of claim 1 wherein each of said plurality of flexible legs comprises a plurality of connectors, said connectors comprising:
   a connector body, said connector body comprising:
      a first end portion;
      a second end portion; and
      a longitudinal axis extending from said first end portion to said second end portion;
      a socket engaging end surface at said first end portion, said socket engaging end surface being the external surface at said first end portion; and
      an internal receiving cavity at said second end portion.

9. The miniature tripod of claim 8 wherein said connector body further comprises a gripping portion, said gripping portion co-molded to said connector.

10. The miniature tripod of claim 9 wherein said gripping portion comprises a rubberized compound.

11. A camera and tripod assembly comprising:
    a camera, said camera having a bottom; and
    a tripod, said tripod comprising:
       an interconnect portion;
       a plurality of flexible legs, said flexible legs comprising a first end and a second end, said first end connected to said interconnect portion, said plurality of flexible legs connected to said interconnect portion by one or more pivots such that said legs are coplanar in a first stowed position; and
       a clip removably attached to said interconnect portion, wherein said clip is attached to the bottom of said camera.

12. The camera and tripod assembly of claim 11 wherein the legs of said tripod are pivotable from a stowed position along the bottom of the camera to a deployed position away from the bottom of the camera.

13. The camera and tripod assembly of claim 12 wherein said plurality of flexible legs stow align aligned in a stowed position in a direction parallel to the mounting plane of the clip.

14. The camera and tripod assembly of claim 12 wherein said legs comprise extendable portions.

* * * * *